United States Patent [19]

Harton et al.

[11] Patent Number: 4,886,468
[45] Date of Patent: Dec. 12, 1989

[54] INSULATED ELECTRICAL POWER DISTRIBUTION BUSWAY TABS

[75] Inventors: Lynn M. Harton; Bruce R. Rosenberger; John D. Anderson; Clarence W. Walker, all of Selmer, Tenn.

[73] Assignee: General Electric Company, New York, N.Y.

[21] Appl. No.: 281,415

[22] Filed: Dec. 8, 1988

Related U.S. Application Data

[63] Continuation of Ser. No. 203,951, Jun. 8, 1988, abandoned.

[51] Int. Cl.⁴ .............................................. H01R 25/16
[52] U.S. Cl. .................................... 439/212; 174/68.2
[58] Field of Search ............................... 439/207–213, 439/114; 174/68.2

[56] References Cited

U.S. PATENT DOCUMENTS

| | | | |
|---|---|---|---|
| 3,391,378 | 7/1968 | Fisher | 439/212 |
| 3,584,138 | 6/1977 | Pritzen, Jr. | 174/68.2 |
| 4,394,532 | 7/1983 | Hguayo | 174/72 B |
| 4,758,172 | 7/1988 | Richards et al. | 439/212 |

FOREIGN PATENT DOCUMENTS 40590  12/1975  Japan ................................ 174/72 B

OTHER PUBLICATIONS

Electro-Technology, pp. 120 & 121, Dec. 1961.

Primary Examiner—Gary F. Paumen
Attorney, Agent, or Firm—Richard A. Menelly; Walter C. Bernkopf; Fred Jacob

[57] ABSTRACT

An electric power busway system includes a plurality of closely spaced bus bar conductors with each bus conductor having at least one offset contact blade extension welded or brazed thereto. The contact blades engage corresponding contact spring type receiver stabs within a power take-off assembly with interphase insulators arranged between the corresponding blade receive stabs.

8 Claims, 3 Drawing Sheets

INSULATED ELECTRICAL POWER DISTRIBUTION BUSWAY TABS

This is a continuation, of application Ser. No. 203,951, filed 6/8/88, now abandoned.

BACKGROUND OF THE INVENTION

Electric power busway used within industrial power distribution systems generally consist of a plurality of rectangular copper or aluminum bars closely spaced and separated by means of an electrically insulative coating. Every two feet or so, the bars are shaped to provide a spaced gap between the individual bars and the bottom edge of each of the bars is abraded to remove the insulative material and expose a contact region on both flat sides of the bar. This exposed contact is then tin or silver-plated to provide an electric contact blade for connection with a power take-off assembly which includes a corresponding plurality of blade receiver stabs which mate with the blade portions of the shaped bars. The air gaps between the shaped bars provide sufficient electrical insulative spacing to prevent arcing between the different phases of a multi-phase power system wherein each bar carries one-phase of the system current. The so-called "expanded connector region" containing the shaped bars effectively provide electrical access to the busway by means of the contact blades. When a four-bus power distribution system is employed, the added length for each expanded connector region corresponds to an increase of approximately six percent for each bar. For the four-bus power distribution system, this represents an equivalent six percent increase in the weight of conductor material over an equivalent linear distance spanned by the closely spaced bars within the remaining extent of the bus system. For the long lengths of busway required in most industrial operations, the amount of extra conductor material required to provide sufficient expanded connector regions is substantial.

U.S. patent application Ser. No. 122,863 filed Nov. 19, 1987 entitled "Thermally Efficient Power Busway Housing" describes a lightweight electrical power bus assembly that includes power bus conductors bolted to the power bus housing. To expand these bus bars to provide for connection with thepower take-off assembly would create thermal loads to the system to substantially reduce the overall thermal efficiency. This Patent Application is incorporated herein for purppses of reference and should be reviewed for its teachings of the use of thermally conductive and electrically insulative coatings.

U.S. patent application Ser. No. 107,320 filed Oct. 13, 1987 entitled "Power Distribution Busway System" teaches the use of an expanded integrally formed contact blade on each of the bus bars in the power take-off region of the system to allow for connection with the power take-off assembly without expanding the respective bus bars. This Application is also incorporated herein for purposes of reference. The use of integrally formed contact blades, however, requires expensive forming equipment that must be incorporated within the bus bar manufacturing operation. The present invention proves a simpler and more cost efficient method of providing extended contact blades.

U.S. Pat. No. 4,394,532 and Japanese Patent 40590 both describe the attachment of linear contact blades to miniaturized bus bars used within electronic computers for electrical connection with the individual bus bars. The attachment of linear contact blades to industrial power distribution systems carrying currents in excess of hundreds of amperes, however, has not heretofore proved commercially feasible.

One purpose of the instant invention therefore, is to provide a power bus system which allows interconnection with a plurality of power take-off assemblies without increasing the amount of conductor material at each individual power take-off position and without having to expand a part of the individual power buses.

SUMMARY OF THE INVENTION

Rectangular power bus conductors within a closely-spaced power bus system are each provided with an off-set extending conductor blade to provide a power take-off region for electrical connection with a power take-off assembly without increasing the amount of copper material used within the power bus system. Each conductor blade is off-set from the preceding blade within the power take-off region to provide sufficient interphase air gas for electrical isolation purposes.

GENERAL DESCRIPTION OF THE INVENTION

Figure 1:
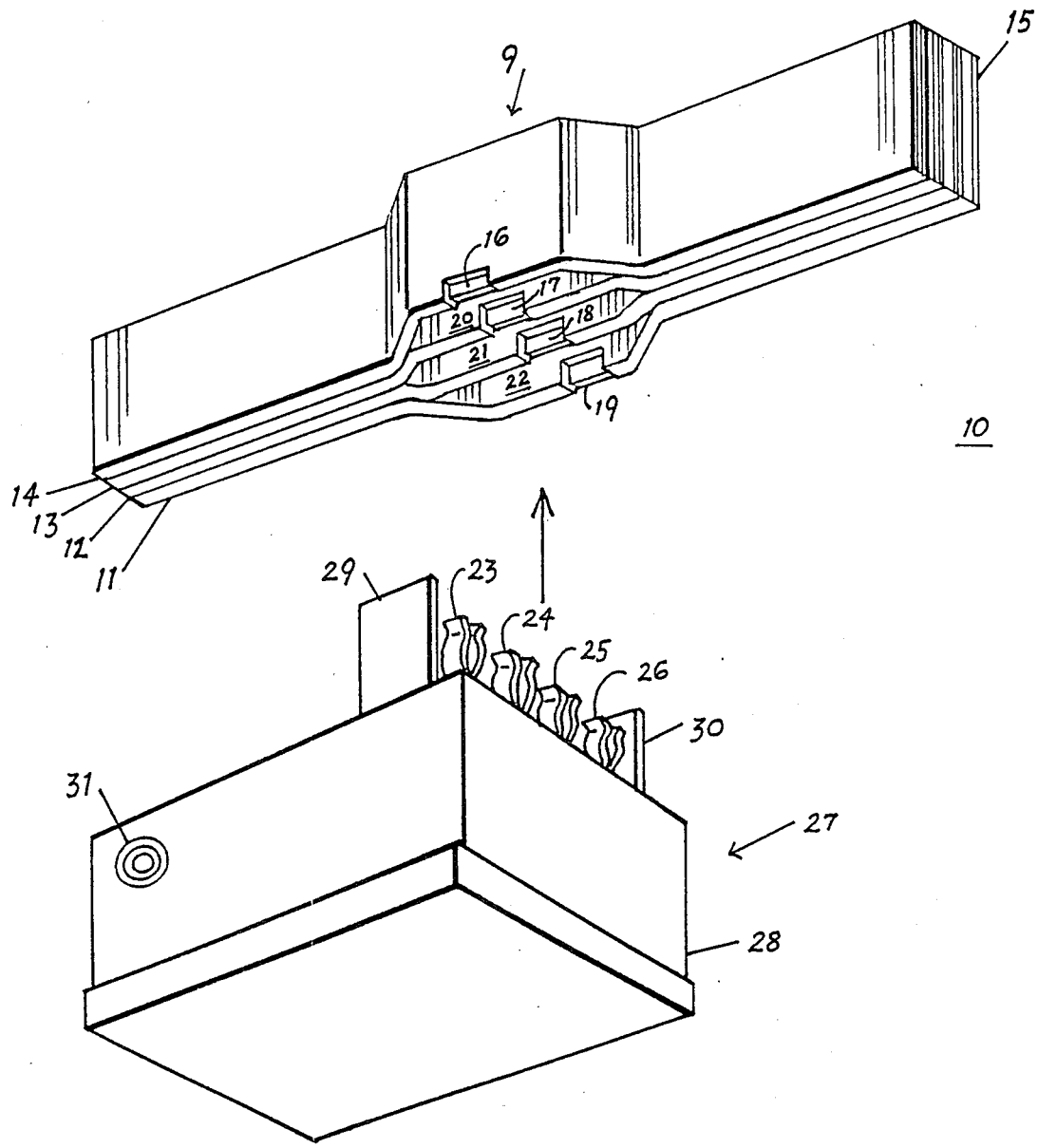
FIG. 1 is a bottom perspective view of a multiphase busway system and power take-off assembly according to the prior art.

Before describing the electric power busway system of the invention, it is helpful to describe one example of a power busway system 10 as currently employed which is depicted in FIG. 1. The busway system usually includes four bus bar conductors 11–14 (hereafter "bars"), each carrying a separate phase of a multi-phase power distribution system and each containing an insulative coating 15 to electrically insulate the bars from each other and the housing (not shown). An expanded connector region 9 is shown along the bars wherein each of the bars is shaped to define corresponding spaces 20, 21, 22 and the insulation is removed to expose a copper or aluminum contact blade 16–19 which is subsequently tin or silver-plated. These expanded connector regions 9 are arranged every two feet or so to accommodate a power take-off assembly 27 for delivering power to associated electrical equipment. A commonly employed power take-off assembly generally comprises a metallic enclosure 28 which supports three or four corresponding spring type contact blade receiver stabs 23–26 which are electrically insulated from each other and from the enclosure 28. A pair of metal grounding plates 29, 30 are provided outboard of the receiver stabs. A knock-out 31 is formed within one side of the enclosure to allow for wire connection between the contact blade receiver stabs and the associated electrical equipment. When electrical interconnection is made between two separate power busway systems, a similar expanded connector region with the contact blades omitted, is employed. One such power busway interconnecting arrangement is described within U.S. patent application Ser. No. 194,655 entitled "Adjustable Joint for Electrical Busway" and U.S. patent application Ser. No. 193,000 entitled "Thermally Efficient Splice Joint for Electrical Distribution Busway". Both of these Applications are incorporated herein for purposes of reference and should be reviewed for their teachings of busway joint connectors.

Figure 2:
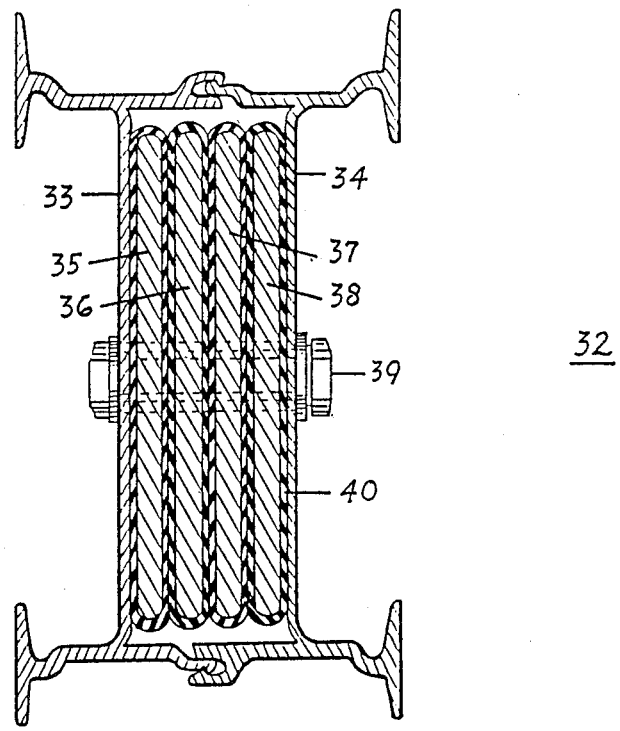
FIG. 2 is a front sectional view of a thermally efficient busway system used with bus bars having the contact blade tabs according to the invention.

A thermally efficient busway system 32 such as described in the aforementioned U.S. patent application Ser. No. 122,683 is depicted in FIG. 2 to consist of a pair of side plates 33, 34 encompassing bus bars 35-38. The side plates and bus bars are held together by means of a thru-bolt 39 and an insulative epoxy coating 40 electrically isolates the bus bars from each other and from the side plates. As noted within the aforementioned U.S. patent application, the close proximity of the bus bars promotes the transfer of heat out to the side plates 33, 34 whereby the heat becomes dissipated to the surrounding air. It is important therefore not to have to separate the bus bars in order to provide for interconnection therewith. The invention accordingly provides means for allowing for electrical connection with the individual bus bars within a thermally efficient busway system without having to separate the individual bus bars.

DESCRIPTION OF THE PREFERRED EMBODIMENT

Figure 3A:
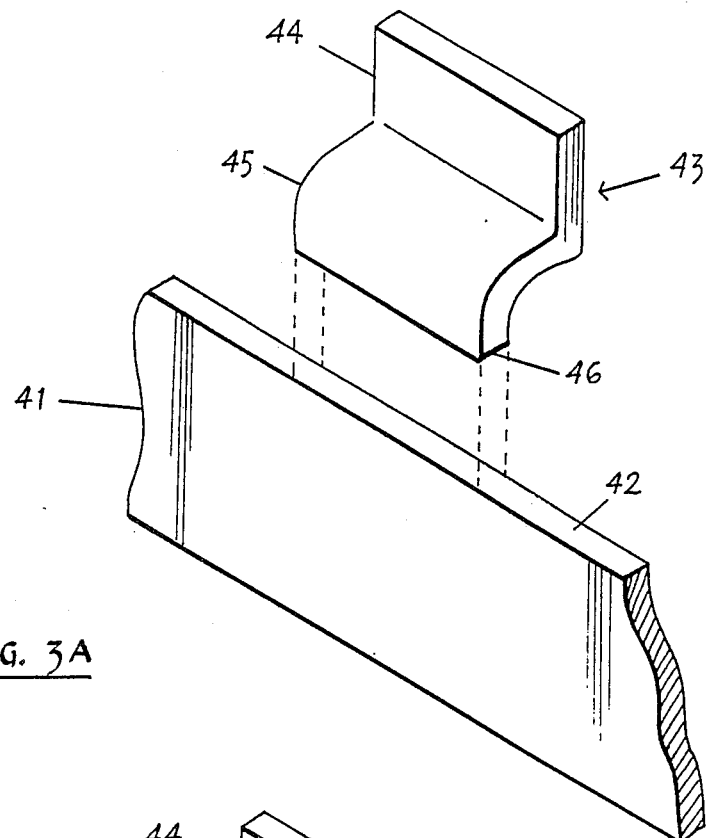
FIGS. 3A and 3B are top perspective views of the contact blade tabs and bus bars according to the invention.
Figure 3B:
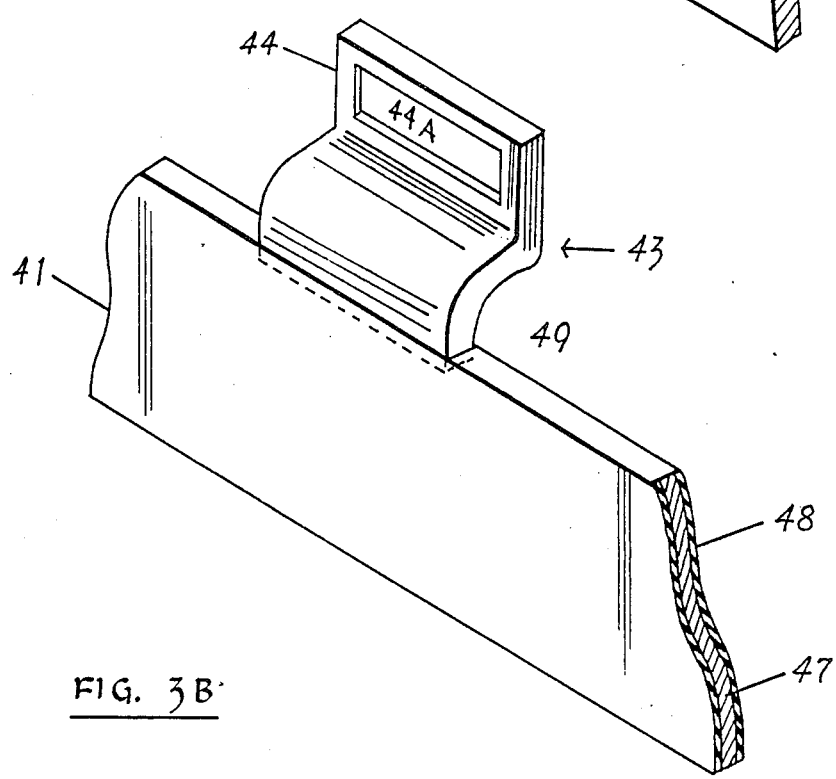

The means for providing electrical connection with the bus bars within the busway system 32 according to the invention is best seen by referring now to FIGS. 3A and 3B. An off-set contact blade tab 43, hereafter "off-set tab", is formed from a single bar of copper or aluminum to define a planar vertical surface 44 extending in a second plane and a curved surface 45. The planar surface 44 is arranged for good electrical connection with a power take-off receiver by welding or brazing the bottom edge 46 of the off-set tab 43 onto the top surface 42 of a copper or aluminum bus bar 41 which extends in a first plane parallel to the planar surface 44. When the off-set tab 43 is welded to the bus bar as indicated at 49 in FIG. 3B, an epoxy coating 48 is applied to both the bus bar 41 and the off-set tab 43. The epoxy coating electrically isolates the rectangular copper or aluminum bar 47 and the off-set tab 43, except for that part, 44A of the planar vertical surface 44 to which electrical connection is made. The opposite surface of the off-set tab 43, although not shown, is also masked during the epoxy deposition purpose to insure a good electrical contact with the power take-off receiver.

Figure 4:
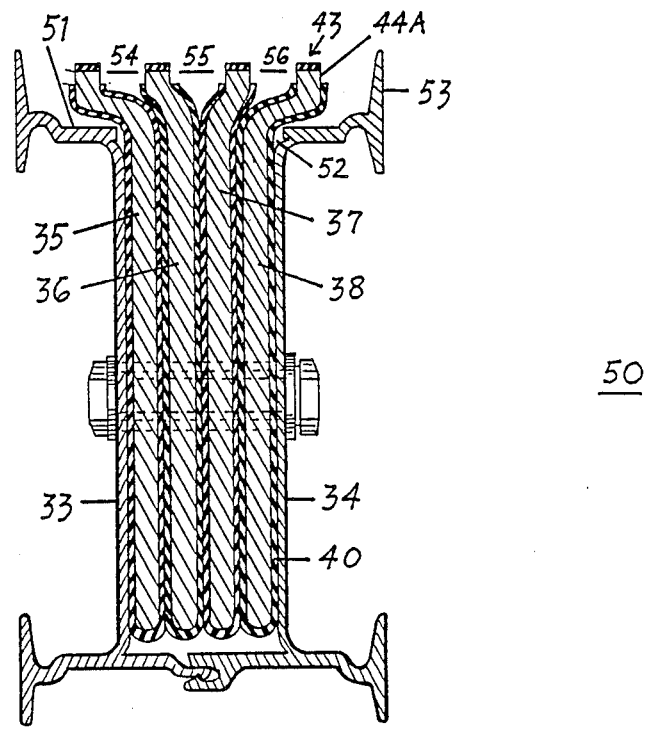
FIG. 4 is a front sectional view of the busway system of FIG. 2 containing bus bars having the contact blade tabs according to the invention.

The function of the curved surface 45 is best seen by referring now to FIG. 4 wherein a busway section 50 is depicted containing bus bars 35'-38', each containing an off-set tab 43 welded thereto. The off-set tabs extend upwards through a slot 52 formed in the cross-piece 51 that joins the upstanding rails 53 on the busway enclosure side plates 33, 34 to define insulating spaces 54, 55, 56 which can receive standard power take-off assemblies such as depicted earlier at 27 in FIG. 1. It is noted that the epoxy coating 40 is applied to the bus bars 35'-38' except for the exposed surfaces 44A. This provides good electrical isolation to the off-set tabs to prevent inadvertent contact therewith except by means of the power take-off assembly.

The provision of a welded connection between the off-set tabs and the bus bars, readily lends itself to an automated welding process whereby the off-set tabs are robotically welded to the bus bars at predetermined locations during the bus bar manufacturing and assembly process.

Having thus described our invention, what we claim as new and desire to secure by Letters Patent is:

1. An electric busway system comprising:
   a plurality of electrically conductive bars, each of said bars being electrically insulated from each other, and extending parallel to each other;
   a pair of metallic side plates, one on each side of said plurality of conductive bars, said plates providing a housing enclosure to said conductive bars; and
   a plurality of tabs, each said tab extending parallel to and being welded or brazed to a respective said conductive bar said tabs being offset from each other to define spaces between adjacent said tabs to facilitate insertion of electrical connection means into said spaces, thereby providing external electrical connection with said tabs.

2. The electric busway system of claim 1 including an insulative coating on said tabs except for predetermined surfaces adjacent said spaces, said predetermined surfaces providing electrical contact with said electrical connection means.

3. The electrical busway system of claim 1 wherein said tabs each comprise a planar surface and a curvilinear surface, said curvilinear surfaces each being arranged proximate to a respective said conductive bar and each said planar surface being arranged away from a respective said conductive bar.

4. The electric busway system of claim 1 wherein said conductive bars and said tabs comprise non-ferrous metal.

5. The electric busway system of claim 2 wherein said insulative coating comprises epoxy.

6. The electric busway system of claim 2 including a tin or silver coating on said predetermined surfaces.

7. The electric busway system of claim 1 wherein said tabs are attached to said conductive bars at predetermined distances along said first plane.

8. An electric busway system comprising:
   a plurality of electrically conductive bars, each of said bars being electrically insulated from each other and extending parallel to each other;
   a pair of metallic side plates, one on each side of said plurality of conductive bars, said plates providing a housing enclosure to said conductive bars; and
   a plurality of tabs, each said tab extending parallel to and being welded or brazed to a respective said conductive bar, said tabs being offset from each other to define spaces between adjacent said tabs to facilitate insertion of electrical connection means into said spaces, thereby providing external electrical connection with said tabs, said side plates including a top plate having a slot, whereby each of said tabs extends through said slot.

* * * * *

UNITED STATES PATENT AND TRADEMARK OFFICE
CERTIFICATE OF CORRECTION

PATENT NO. : 4,886,468

DATED : December 12, 1989

INVENTOR(S) : Harton et al.

It is certified that error appears in the above-identified patent and that said Letters Patent is hereby corrected as shown below:

IN THE CLAIMS:

Column 4, line 45, the sentence should read,

"mined distances along said conductive bars".

Signed and Sealed this

Twenty-fifth Day of September, 1990

Attest:

HARRY F. MANBECK, JR.

*Attesting Officer*      *Commissioner of Patents and Trademarks*